(12) United States Patent
Xiang (10) Patent No.: US 12,027,138 B2
(45) Date of Patent: Jul. 2, 2024

(54) SCREEN ILLUMINANCE CONTROL METHOD FOR PHOTO SHOOTING AND ELECTRONIC DEVICE

(71) Applicant: VIVO MOBILE COMMUNICATION CO., LTD., Dongguan (CN)

(72) Inventor: Yonghang Xiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 74 days.

(21) Appl. No.: 17/845,973

(22) Filed: Jun. 21, 2022

(65) Prior Publication Data
US 2022/0319467 A1    Oct. 6, 2022

Related U.S. Application Data

(63) Continuation of application No. PCT/CN2020/138022, filed on Dec. 21, 2020.

(30) Foreign Application Priority Data

Dec. 25, 2019   (CN) .......................... 201911360983.9

(51) Int. Cl.
*G09G 5/10* (2006.01)
*H04M 1/02* (2006.01)

(52) U.S. Cl.
CPC ............ *G09G 5/10* (2013.01); *H04M 1/0264* (2013.01); *H04M 1/0266* (2013.01); *G09G 2320/0626* (2013.01); *G09G 2320/0686* (2013.01)

(58) Field of Classification Search
CPC ............ G09G 5/10; G09G 2320/0626; G09G 2320/0686; H04M 1/0264; H04M 1/0266;
(Continued)

(56) References Cited

U.S. PATENT DOCUMENTS 11,514,872 B2 *  11/2022  Yang .......................... G09G 5/10
11,615,517 B2 *   3/2023  Pincenti ..................... G06T 5/50
                                                                          348/216.1
(Continued)

FOREIGN PATENT DOCUMENTS

CN          105094307 A       11/2015
CN          105204603 A       12/2015
(Continued)

OTHER PUBLICATIONS

International Search Report issued in corresponding International Application No. PCT/CN2020/138022, dated Mar. 22, 2021, 4 pages.
(Continued)

*Primary Examiner* — Rodney Amadiz
(74) *Attorney, Agent, or Firm* — IPX PLLC (57) ABSTRACT

A shooting control method and an electronic device are provided. The method includes: within a first duration of each working cycle of a capturing process, adjusting a luminance value of a first screen area of the electronic device from a target luminance value to a preset luminance value that is less than the target luminance value, and controlling an under-screen camera of the electronic device to capture an image, where each working cycle includes a first duration and a second duration; and within the second duration after each first duration in the capturing process, controlling the under-screen camera of the electronic device to stop capturing an image, and adjusting the luminance value of the first screen area from the preset luminance value to the target luminance value.

15 Claims, 4 Drawing Sheets

Within a first duration of each working cycle of a capturing process, an electronic device adjusts a luminance value of a first screen area of the electronic device from a target luminance value to a preset luminance value, and controls an under-screen camera of the electronic device to capture an image — S201

Within the second duration after each first duration in the capturing process, the electronic device controls the under-screen camera of the electronic device to stop capturing an image, and adjusts the luminance value of the first screen area from the preset luminance value to the target luminance value — S202

The electronic device adjusts ratios of the first duration in a first working cycle and the second duration in the first working cycle to a total duration of the capturing process according to target state information — S203

(58) Field of Classification Search
CPC .. H04N 1/00411; H04N 23/62; H04N 23/631; H04N 1/00307; H04N 2101/00
See application file for complete search history.

(56) References Cited

U.S. PATENT DOCUMENTS

| | | | |
|---|---|---|---|
| 2002/0024529 A1 | 2/2002 | Miller | |
| 2017/0084231 A1* | 3/2017 | Chew | G09G 3/20 |
| 2021/0304663 A1* | 9/2021 | Kim | G09G 3/3275 |
| 2022/0207675 A1* | 6/2022 | Merrell | H04N 23/72 |
| 2022/0337730 A1* | 10/2022 | Lee | G06T 5/001 |

FOREIGN PATENT DOCUMENTS

| | | |
|---|---|---|
| CN | 107911585 A | 4/2018 |
| CN | 108111690 A | 6/2018 |
| CN | 108366186 A | 8/2018 |
| CN | 109348123 A | 2/2019 |
| CN | 109714484 A | 5/2019 |
| CN | 109714532 A | 5/2019 |
| CN | 110161749 A | 8/2019 |
| CN | 110493390 A | 11/2019 |
| CN | 110519431 A | 11/2019 |
| CN | 110581910 A | 12/2019 |
| CN | 111064891 A | 4/2020 |
| JP | 2006109352 A | 4/2006 |
| WO | 2019213842 A1 | 11/2019 |

OTHER PUBLICATIONS

First Office Action issued in related Chinese Application No. 201911360983.9, dated Jan. 5, 2021, 10 pages.
Extended European Search Report issued in corresponding European Application No. 20905290.1, dated Nov. 22, 2022, 12 pages.

* cited by examiner

```
┌─────────────────────────────────────────────────────────────┐
│  Within a first duration of each working cycle of a capturing process, an  │
│ electronic device adjusts a luminance value of a first screen area of the electronic │ ～S201
│   device from a target luminance value to a preset luminance value, and controls    │
│       an under-screen camera of the electronic device to capture an image           │
└─────────────────────────────────────────────────────────────┘
                                    ↓
┌─────────────────────────────────────────────────────────────┐
│ Within the second duration after each first duration in the capturing process, the  │
│   electronic device controls the under-screen camera of the electronic device to    │ ～S202
│  stop capturing an image, and adjusts the luminance value of the first screen area  │
│              from the preset luminance value to the target luminance value          │
└─────────────────────────────────────────────────────────────┘
                                    ↓
┌─────────────────────────────────────────────────────────────┐
│   The electronic device adjusts ratios of the first duration in a first working cycle │ ～S203
│      and the second duration in the first working cycle to a total duration of the    │
│            capturing process according to target state information.                   │
└─────────────────────────────────────────────────────────────┘
```

SCREEN ILLUMINANCE CONTROL METHOD FOR PHOTO SHOOTING AND ELECTRONIC DEVICE

CROSS-REFERENCE TO RELATED APPLICATIONS

This application is a continuation of International Application No. PCT/CN2020/138022, filed on Dec. 21, 2020, which claims priority to Chinese Patent Application No. 201911360983.9, filed on Dec. 25, 2019. The entire contents of each of the above-identified applications are expressly incorporated herein by reference.

TECHNICAL FIELD

Embodiments of the present disclosure relate to the field of communications technologies, and in particular, to a shooting control method and an electronic device.

BACKGROUND

As communications technologies are developed, screen-to-body ratios of electronic devices become increasingly larger. For example, a front-facing camera may be arranged under the screen of an electronic device (for example, an under-screen camera) to increase the screen-to-body ratio of the electronic device.

SUMMARY

Embodiments of the present disclosure provide a shooting control method and an electronic device, the present application is implemented as follows:

According to a first aspect, an embodiment of the present disclosure provides a shooting control method. The method may include: within a first duration of each working cycle of a capturing process, adjusting a luminance value of a first screen area of the electronic device from a target luminance value to a preset luminance value, and controlling an under-screen camera of the electronic device to capture an image, where each working cycle includes a first duration and a second duration; and within the second duration after each first duration in the capturing process, controlling the under-screen camera of the electronic device to stop capturing an image, and adjusting the luminance value of the first screen area from the preset luminance value to the target luminance value. The first screen area includes a second screen area, and the second screen area is an area that corresponds to a position of the under-screen camera in a lower area of the screen.

According to a second aspect, an embodiment of the present disclosure provides an electronic device. The electronic device includes: an adjustment module and a control module.

The adjustment module is configured to: within a first duration of each working cycle of a capturing process, adjust a luminance value of a first screen area of the electronic device from a target luminance value to a preset luminance value, where each working cycle includes a first duration and a second duration. The control module is configured to: within the first duration of each working cycle of the capturing process, after the adjustment module adjusts the luminance value of the first screen area from the target luminance value to the preset luminance value, control an under-screen camera of the electronic device to capture an image; and within the second duration after each first duration in the capturing process, control the under-screen camera of the electronic device to stop capturing an image. The adjustment module is further configured to: after the control module controls the under-screen camera to stop capturing an image within the second duration, adjust the luminance value of the first screen area from the preset luminance value to the target luminance value. The first screen area includes a second screen area, and the second screen area is an area that corresponds to a position of the under-screen camera in a lower area of the screen.

According to a third aspect, an embodiment of the present disclosure provides an electronic device, including a processor, a memory, and a computer program stored in the memory and executable on the processor. The computer program, when executed by the processor, may implement the steps of the shooting control method in the first aspect.

According to a fourth aspect, an embodiment of the present disclosure provides a computer-readable storage medium. The computer-readable storage medium stores a computer program, and the computer program, when executed by a processor, may implement the steps of the shooting control method in the first aspect.

According to a fifth aspect, an embodiment of the present disclosure provides a computer program product, where the computer program product is executed by at least one processor to implement the shooting control method in the first aspect.

According to a sixth aspect, an embodiment of the present disclosure provides an electronic device, configured to implement the shooting control method in the first aspect.

In the embodiments of the present disclosure, within the first duration of each working cycle (including a first duration and a second duration) of the capturing process (that is, an image capturing process), the electronic device may adjust the luminance value of the first screen area (including an area that corresponds to a position of the under-screen camera in a lower area of the screen) of the electronic device from the target luminance value to the preset luminance value, and control the under-screen camera of the electronic device to capture an image; and within the second duration after each first duration in the capturing process, control the under-screen camera of the electronic device to stop capturing an image, and adjust the luminance value of the first screen area from the preset luminance value to the target luminance value.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In this specification, the terms such as "first" and "second" are used to distinguish between different objects, but are not used to describe a particular sequence of the objects. For example, a first screen area, a second screen area, and the like are used for distinguishing different screen areas, but are not used for describing a particular sequence of the screen areas.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

In the description of the embodiments of the present disclosure, unless otherwise specified, the meaning of "a plurality of" means two or more. For example, a plurality of elements mean two or more elements.

At present, since the under-screen camera is located under the screen of the electronic device, when the screen is turned on, light emitted by a light-emitting layer of the screen may be reflected to the under-screen camera by a substrate (for example, a glass substrate) of the screen. Therefore, when the electronic device captures an image of an object through the under-screen camera, if the screen of the electronic device is turned on, light captured by the under-screen camera may include the light reflected by the substrate of the screen. As a result, the light captured by the under-screen camera may deviate from light reflected by the object, and consequently the image captured by the under-screen camera may be distorted.

The following first explains some nouns or terms in the claims and the specification of the present application.

Under-screen camera: camera disposed under the screen of an electronic device when the electronic device is placed horizontally with the back of the electronic device facing downwards and the screen facing upwards.

Persistence of vision of the human eye: When the human eye looks at an object, an image of the object can be formed on the human retina and transmitted to the human brain by the optic nerve, so that humans can perceive the image of the object. However, when the object is removed, the image of the object does not disappear from the human optic nerve immediately, and instead stays for 0.1 seconds to 0.4 seconds. This phenomenon of the human eye is called "persistence of vision of the human eye". A duration in which the image of the object stays in the human optic nerve can be called a duration of persistence of vision of the human eye.

Screen-off state: state in which the screen of an electronic device is turned off. For example, when the electronic device is in a screen-on state, a user can trigger the electronic device to turn off the backlight by pressing the power key, so that the screen of the electronic device is turned off, that is, the electronic device is in a screen-off state.

Screen-on state: state in which the screen of an electronic device is turned on. For example, when the electronic device is in a screen-off state, a user can trigger the electronic device to turn on the backlight by pressing the power key/home key, so that the screen of the electronic device is turned on, that is, the electronic device is in a screen-on state. The screen-on state may include a screen lock state and a screen unlock state.

Screen lock state: state in which the screen of an electronic device is in a screen-on state and a screen lock interface is displayed, that is, a state of the electronic device in which the screen of the electronic device is turned on but is not unlocked.

Screen unlock state: state in which the screen of an electronic device is in a screen-on state and content of the electronic device other than a screen lock interface is displayed, that is, a state of the electronic device in which the screen of the electronic device is turned on and is unlocked.

The embodiments of the present disclosure provide a shooting control method and an electronic device. The shooting control method can be applied to an electronic device. Within the first duration of each working cycle (including a first duration and a second duration) of the capturing process (that is, an image capturing process), the electronic device may adjust the luminance value of the first screen area (including an area that corresponds to a position of the under-screen camera in a lower area of the screen) of the electronic device from the target luminance value to the preset luminance value, and control the under-screen camera of the electronic device to capture an image; and within the second duration after each first duration in the capturing process, control the under-screen camera of the electronic device to stop capturing an image, and adjust the luminance value of the first screen area from the preset luminance value to the target luminance value. In this solution, when the electronic device captures an image through the under-screen camera, on the one hand, the electronic device can first reduce the luminance of the screen area corresponding to the under-screen camera before capturing an image, and then control the under-screen camera to capture an image. Therefore, this can prevent light emitted by the screen from affecting the images captured by the under-screen camera. On the other hand, the electronic device can increase the luminance of the screen area corresponding to the under-screen camera after controlling the under-screen camera to stop capturing an image. Therefore, this can ensure that the screen has a desirable display effect when the under-screen camera does not capture an image. In this way, the shooting control method provided by the embodiments of the present disclosure can not only ensure that the image captured by the under-screen camera is not distorted, but also can ensure that the screen has a desirable display effect.

In the shooting control method provided by the embodiments of the present disclosure, the capturing process of the electronic device is a process of capturing an image by the electronic device. Specifically, the capturing process of the electronic device may be a process in which the electronic device captures an image through an under-screen camera of the electronic device.

In the embodiments of the present disclosure, in the capturing process of the electronic device, the electronic device can obtain a frame image through two steps of signal capturing and signal processing. Specifically, signal capturing is: a camera obtains an optical signal and converts the optical signal into an analog electrical signal based on the photoelectric effect. Signal processing is: an electronic device or a camera converts the analog electrical signal captured by the camera into a digital image signal. In this way, the electronic device may obtain a frame image.

It can be understood that, in the embodiments of the present disclosure, the time required for the signal capturing step and the time required for the signal processing step are the time required for the camera to capture a frame image, that is, a capturing cycle of the camera.

The electronic device in the embodiments of the present disclosure may be a mobile electronic device or a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a personal computer (PC), a television (TV), an automated teller machine or a self-service machine. This is not specifically limited in the embodiments of the present disclosure.

The shooting control method provided in the embodiments of the present disclosure may be performed by the foregoing electronic device or a functional module and/or a functional entity that can implement the shooting control method in the electronic device. This may be specifically determined according to an actual use requirement, and is not limited in the embodiments of the present disclosure. Taking the electronic device as an example, the following exemplarily describes the shooting control method provided in the embodiments of the present disclosure.

In the embodiments of the present disclosure, when an electronic device is provided with an under-screen camera, a user can trigger the electronic device to capture an image through the under-screen camera. For example, the user can trigger the electronic device to capture a facial image of the user through the under-screen camera for facial recognition, video recording, and photo shooting.

If the user triggers the electronic device to capture an image through the under-screen camera, the electronic device can first detect a screen state of the electronic device. If the screen of the electronic device is in a screen-off state, the electronic device can directly start the under-screen camera, and capture an image through the under-screen camera. If the screen of the electronic device is in a screen-on state (for example, displays content), the electronic device can control the under-screen camera to capture an image by executing the shooting control method provided by the embodiments of the present disclosure.

Specifically, the electronic device may start the under-screen camera, and within each A duration (which, for example, can be a duration of persistence of vision of the human eye) after the under-screen camera is started, reduce the luminance of at least a part of the screen area of the electronic device from a luminance value for normally displaying content (for example, the target luminance value in the embodiments of the present disclosure) to a preset luminance value, and control the under-screen camera to capture an image. This can prevent light emitted by the screen from affecting the images captured by the under-screen camera. Then, within a duration B after each duration A after the under-screen camera is started, the electronic device can control the under-screen camera to stop capturing an image, and increase the luminance of at least a part of the screen area from the preset luminance value to the target luminance value, to normally display content, to ensure that the screen has a desirable display effect when the under-screen camera does not capture an image. By analogy, the electronic device completes the process of capturing an image through the under-screen camera. In this way, the shooting control method provided by the embodiments of the present disclosure can not only ensure that the image captured by the under-screen camera is not distorted, but also can ensure that the screen has a desirable display effect.

In the embodiments of the present disclosure, the screen-on state may include a screen lock state and a screen unlock state. For detailed description of the screen lock state and the screen unlock state, refer to the relevant description of the screen lock state and the screen unlock state in the term explanation described above. To avoid repetition, details are not repeated herein.

The following provides exemplary description of the shooting control method provided in the embodiments of the present disclosure with reference to accompanying drawings.

Figure 1:
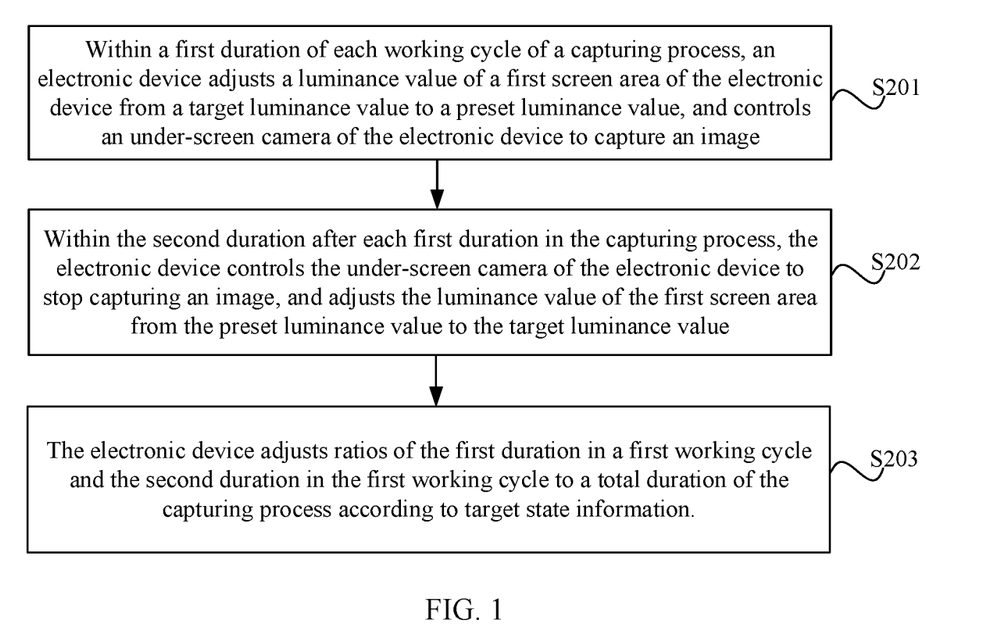
FIG. 1 is a schematic diagram of a shooting control method according to an embodiment of the present disclosure.

As shown in FIG. 1, an embodiment of the present disclosure provides a shooting control method. The method may include the following S201 and S202.

S201: Within a first duration of each working cycle of a capturing process, an electronic device adjusts a luminance value of a first screen area of the electronic device from a target luminance value to a preset luminance value, and controls an under-screen camera of the electronic device to capture an image.

S202: Within the second duration after each first duration in the capturing process, the electronic device controls the under-screen camera of the electronic device to stop capturing an image, and adjusts the luminance value of the first screen area from the preset luminance value to the target luminance value.

For example, in the embodiments of the present disclosure, the first screen area may include a second screen area, and the second screen area may be an area that corresponds to a position of the under-screen camera in a lower area of the screen.

For example, in the embodiments of the present disclosure, the capturing process may be a process of capturing an image by an electronic device. Specifically, the capturing process is a process of capturing an image by the electronic device through an under-screen camera (hereinafter may be referred to as a process of capturing an image by the under-screen camera for short).

Figure 2:
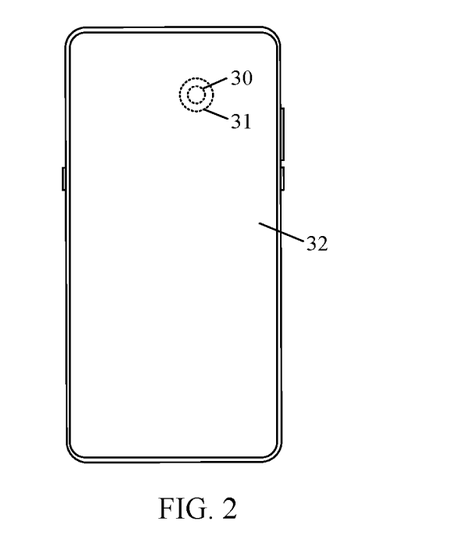
FIG. 2 is a schematic diagram 1 of an application interface of a shooting control method according to an embodiment of the present disclosure.

For example, in the embodiments of the present disclosure, in actual implementation, the first screen area may be the second screen area, that is, an area shown as 30 in FIG. 2, or may be the second screen area and the periphery of the second screen area, that is, an area shown as 31 in FIG. 2, or may be the entire screen area of the electronic device, that is, an area shown as 32 in FIG. 2. This may be specifically determined according to an actual usage requirement and is not limited in the embodiments of the present disclosure.

In the embodiments of the present disclosure, the process of capturing an image by the electronic device may include at least one working cycle. Each working cycle may include a first duration and a second duration.

For example, in the embodiments of the present disclosure, when the process of capturing an image by the electronic device includes multiple (that is, two or more) working cycles, a second duration may be included after each first duration and a first duration may be included after each second duration, that is, the first duration and the second duration are distributed in sequence at intervals.

It should be noted that, in the embodiments of the present disclosure, when the process of capturing an image by the electronic device includes multiple working cycles, the duration of each working cycle may not be limited. For example, assuming that the duration of the first working cycle is 10 seconds, the duration of the second working cycle may be greater than 10 seconds, equal to 10 seconds, or less than 10 seconds. This may be specifically determined according to an actual usage requirement, and is not limited in the embodiments of the present disclosure.

For example, in the embodiments of the present disclosure, in the process of capturing an image by the electronic device, the number of second durations and the number of first durations may be the same. For example, assuming that the number of first durations in the process of capturing an image by the electronic device is N, the number of second durations in the process of capturing an image by the electronic device is also N, where N may be a positive integer.

In the embodiments of the present disclosure, the preset luminance value may be smaller than the target luminance value, and specific values of the preset luminance value and the target luminance value may be determined according to actual use requirements and are not limited in the embodiments of the present disclosure.

Exemplarily, in the embodiments of the present disclosure, when the luminance value of the screen of the electronic device is the target luminance value, the screen of the electronic device can normally display content, that is, content displayed by the electronic device is visible to a user. When the luminance value of the screen of the electronic device is the preset luminance value, the content displayed on the screen of the electronic device is basically invisible to a user.

For example, in the embodiments of the present disclosure, the preset luminance value may be 0. In this way, since the preset luminance value is 0, when the electronic device controls the under-screen camera to capture an image, light emitted by the screen has no impact on imaging quality of the under-screen camera, thereby further improving imaging quality of the under-screen camera.

It should be noted that, in the embodiments of the present disclosure, the camera may capture an image based on a frame. For example, it is assumed that the electronic device controls the camera to start capturing an image at time A and controls the camera to stop capturing an image at time B. If the duration between time A and time B is greater than or equal to the time required for the camera to capture a frame image, that is, greater than the capturing cycle of the camera, the electronic device can capture at least one frame image through the camera within the duration. If the duration between time A and time B is less than the time required for the camera to capture a frame image, the electronic device cannot capture any image through the camera within the duration.

For example, in the embodiments of the present disclosure, that the electronic device controls the under-screen camera to stop capturing an image may be: the electronic device controls the under-screen camera to be disabled (implementation 1), or the electronic device may keep the under-screen camera started and stop processing an optical signal captured by the under-screen camera (implementation 2).

In implementation 1, in S202, that the electronic device controls the under-screen camera to capture an image may be: the electronic device controls the under-screen camera to be started and starts to process an optical signal most recently captured by the under-screen camera. In implementation 2, in S202, that the electronic device controls the under-screen camera to capture an image may be: the electronic device starts to process an optical signal most recently captured by the under-screen camera.

For example, in the embodiments of the present disclosure, the first duration may be less than or equal to a duration of persistence of vision of the human eye, and may be greater than or equal to a duration for capturing a frame image by the under-screen camera, that is, the first duration is greater than or equal to the capturing cycle of the camera.

The relationship between the first duration, the second duration, and the duration for the camera to capture a frame image is exemplarily described below with reference to FIG. 3.

Figure 3:
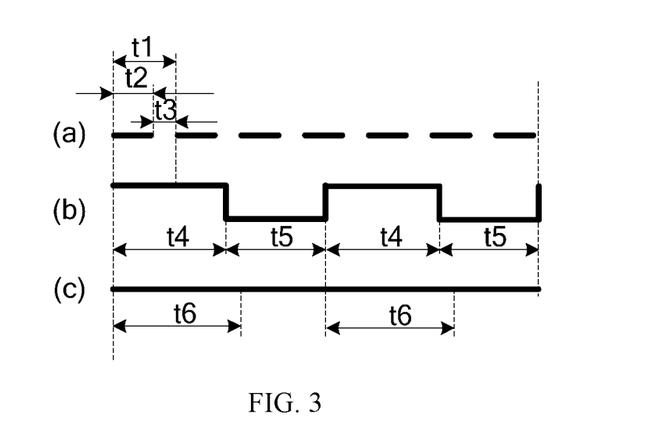
FIG. 3 is a schematic time sequence diagram 1 of a shooting control method according to an embodiment of the present disclosure.

Exemplarily, (a) in FIG. 3 may be a schematic time sequence diagram of capturing an image by the camera. t1 may be the capturing cycle of the camera, t2 may be the time required for the camera to convert an optical signal into an analog electrical signal, and t3 may be a time required for the camera to convert an analog electrical signal into a digital image signal, that is, $t1=t2+t3$. (b) in FIG. 3 may be a schematic time sequence diagram of a working cycle. t4 may be the first duration and t5 may be the second duration. (c) in FIG. 3 may be a schematic diagram of a duration of persistence of vision of the human eye. t6 may be a duration of persistence of vision of the human eye, and $0.1 \leq t6 \leq 0.4$ (unit: second/s). In this case, $t1 \leq t4 \leq t6$.

In the embodiments of the present disclosure, on the one hand, because the first duration is short, the human eye can hardly perceive flickering of the screen. Therefore, this can ensure that visual experience of the user is not affected. On the other hand, because the under-screen camera can capture at least one frame image that is not affected by light emitted by the screen, imaging quality of the under-screen camera can be improved.

For example, in the embodiments of the present disclosure, in an implementation, the electronic device may uniformly reduce the luminance value of the light emitted in the first screen area, to reduce the luminance of the first screen area. In another implementation, since diffraction is more obvious as the wavelength of light is longer, light emitted by the screen has more serious impact on the image captured by the under-screen camera if the wavelength of the light emitted by the screen is longer. Therefore, the electronic device may also reduce the luminance value of light (that is, light with the longest wavelength) corresponding to some colors in the first screen area, to reduce the luminance of the first screen area to prevent the light with the longest wavelength emitted by the screen from affecting the image captured by the under-screen camera. This may be specifically determined according to an actual usage requirement, and is not limited in the embodiments of the present disclosure.

For example, in the embodiments of the present disclosure, the electronic device may adjust the luminance value of the first screen area by adjusting a drive voltage of the first screen area.

For example, in the embodiments of the present disclosure, when the electronic device reduces the luminance value of light corresponding to some colors (for example, the following target color) in the first screen area, S201 may be specifically implemented by the following S201a and S202 may be specifically implemented by the following S202a.

S201a: Within the first duration of each working cycle of the capturing process, the electronic device adjusts a luminance value of light corresponding to a target color in the first screen area from the target luminance value to the preset luminance value, and controls the under-screen camera of the electronic device to capture an image.

S202a: Within the second duration after each first duration in the capturing process, the electronic device controls the under-screen camera of the electronic device to stop capturing an image, and adjusts the luminance value corresponding to the target color in the first screen area from the preset luminance value to the target luminance value.

The target color may be a color corresponding to the light with the longest wavelength in the first screen area.

It should be noted that, in the embodiments of the present disclosure, the light with the longest wavelength in the first screen area is a primary color light with the longest wavelength of primary color light emitted in the first screen area. The primary color light includes: red (red, R) light, green (green, G) light, and blue (blue, B) light.

Exemplarily, it is assumed that the color of the light in the first screen area is yellow, that is, the color of the light seen by the user is yellow. In this case, since the yellow light may be formed by mixing red light and green light, and the wavelength range of the red light is 622 nm to 770 nm and the wavelength range of green light is 492 nm to 577 nm, the light with the longest wavelength in the first screen area is red light. Therefore, the electronic device may reduce the luminance value of the red light in the first screen area to the preset luminance value.

In another example, it is assumed that the color of the light in the first screen area is Turkish blue, that is, the color of the light seen by the user is Turkish blue. In this case, since Turkish blue light may be formed by mixing green light and blue light, and the wavelength range of green light is 492 nm to 577 nm and the wavelength range of blue light is 455 nm to 492 nm, the light with the longest wavelength in the first screen area is green light. Therefore, the electronic device may reduce the luminance value of the green light in the first screen area to the preset luminance value.

In the embodiments of the present disclosure, since the electronic device may adjust the luminance value of the light with the longest wavelength in the first screen area to the preset luminance within the first duration, this can prevent the light with the longest wavelength of the light emitted by the screen from affecting the image captured by the under-screen camera, to improve imaging quality of the under-screen camera.

The shooting control method provided by the embodiments of the present disclosure is exemplarily described below with reference to FIG. 4.

Exemplarily, it is assumed that the screen of the electronic device is in a screen-on state, the first duration is 0.2 seconds and the second duration is 0.25 seconds, a duration for the under-screen camera to capture a frame image is 0.05 seconds, and the preset luminance value is 0 (in this case, it may be considered that the first screen area is in a screen-off state). In this case, after the user triggers the electronic device to start the under-screen camera, as shown in (a) of FIG. 4, the electronic device may adjust the luminance value of the first screen area 50 of the electronic device from the target luminance value to 0 (that is, the preset luminance value) within the first 0.2 seconds, and control the under-screen camera to capture an image. That is, within the first duration of each working cycle of the capturing process, the electronic device adjusts the luminance value of the first screen area from the target luminance value to the preset luminance value, and controls the under-screen camera of the electronic device to capture an image. Then, as shown in (b) of FIG. 4, the electronic device may control the under-screen camera to stop capturing an image within 0.25 seconds after the first 0.2 seconds, and adjust the luminance value of the first screen area 50 from 0 to the target luminance value. That is, within the second duration after each first duration in the capturing process, the electronic device adjusts the luminance value of the first screen area from the preset luminance value to the target luminance value, and controls the under-screen camera of the electronic device to stop capturing an image.

Figure 4:
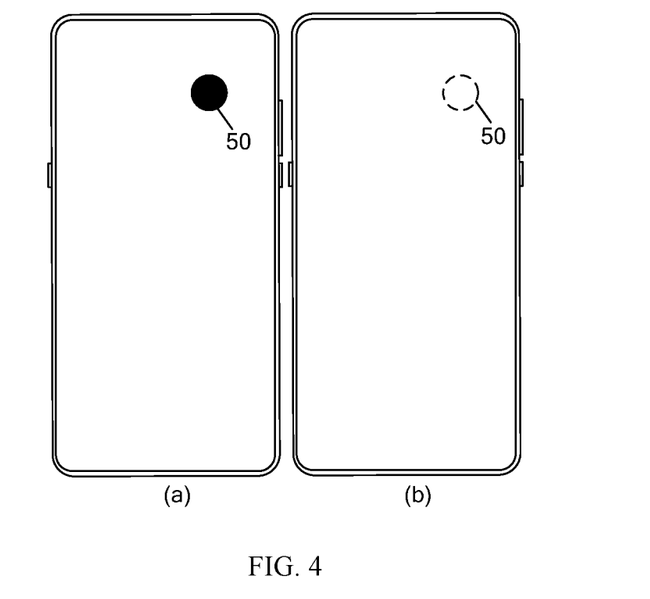
FIG. 4 is a schematic diagram 2 of an application interface of a shooting control method according to an embodiment of the present disclosure.

It should be noted that the dashed block 50 used to indicate the first screen area in (b) of FIG. 4 is only for illustration, and in actual implementation, the dashed block is invisible to the user.

In the shooting control method provided by the embodiments of the present disclosure, when capturing an image through the camera, the electronic device may reduce the luminance value of at least a part of screen area of the screen of the electronic device when the under-screen camera captures an image, and when the under-screen camera stops capturing an image, increase the luminance value of this part of screen area of the electronic device. That is, when capturing an image through the camera, the electronic device may display content (specifically, the luminance value of the screen is lower) in a period different from that of capturing an image. Therefore, on the one hand, this can prevent light emitted by the screen from affecting the imaging quality of the under-screen camera, to avoid the distortion of the image captured by the under-screen camera. On the other hand, this can ensure that the screen of the electronic device has a desirable display effect.

In this way, the shooting control method provided by the embodiments of the present disclosure can not only ensure the imaging quality of the under-screen camera of the electronic device, but also ensure the screen display effect of the electronic device, thereby improving the human-computer interaction performance.

For example, in the embodiments of the present disclosure, the under-screen camera of the electronic device is in different states (for example, the following target state) in a work cycle (for example, the following second working cycle) of the capturing process, and ratios of the first duration in a next working cycle of the second working cycle (for example, the following first working cycle) and the second duration in the first working cycle to the total duration of the capturing process may be different.

Specifically, the electronic device may adjust the ratios of the first duration and the second duration in the first working cycle to the total duration of the capturing process according to the target state of the under-screen camera in the second working cycle.

Exemplarily, the shooting control method provided by the embodiments of the present disclosure may further include the following S203.

S203: The electronic device adjusts ratios of the first duration in a first working cycle and the second duration in the first working cycle to a total duration of the capturing process according to target state information.

The first working cycle may be a next working cycle of a second working cycle, and the target state information is used to indicate a target state of the under-screen camera of the electronic device in the second working cycle.

For example, in the embodiments of the present disclosure, the target state is any one of the following: state 1 in which the electronic device recognizes a facial object through the under-screen camera; state 2 in which the under-screen camera of the electronic device moves relative to an object captured by the under-screen camera; state 3 in which the under-screen camera of the electronic device is stationary relative to an object captured by the under-screen camera; and state 4 in which the under-screen camera of the electronic device is disabled.

For example, in the embodiments of the present disclosure, a correspondence between a target state and a duration ratio may be pre-stored in the electronic device, where the duration ratio may be a ratio of the first duration to the second duration. In this way, when the under-screen camera of the electronic device is in a target state in the second working cycle, the electronic device may adjust a ratio of the first duration to the second duration in the first working cycle according to the duration ratio corresponding to the target state, to adjust the ratios of the first duration in the first working cycle and the second duration in the first working cycle to the total duration of the capturing process.

It should be noted that, in the embodiments of the present disclosure, in all the above state 1, state 2, and state 3, the under-screen camera is started. In state 1, the under-screen camera may move relative to the object captured by the under-screen camera (corresponding to state 2), or the under-screen camera may be stationary relative to the object captured by the under-screen camera (corresponding to state 3), that is, the electronic device may be in state 1 and state 2 at the same time, or may be in state 1 and state 3 at the same time. Therefore, priorities of state 1, state 2, and state 3 may be preset in the electronic device. For example, the priority of state 1 may be greater than the priorities of state 2 and state 3. In this way, the electronic device may determine a duration ratio corresponding to a target state with the highest priority as a ratio of the first duration to the second duration in the first working cycle, to adjust the ratios of the first duration in the first working cycle and the second duration in the first working cycle to the total duration of the capturing process.

For example, in the embodiments of the present disclosure, the electronic device may obtain the target state information by detecting the state of the under-screen camera of the electronic device in the second working cycle, to determine the target state of the under-screen camera of the electronic device in the second working cycle.

Specifically, for state 1, the electronic device may obtain the target state information by obtaining information of an operation performed by the electronic device in the second working cycle, to determine whether the under-screen camera of the electronic device is in one of the target states according to the target state information. If the information of the operation obtained by the electronic device is information of an operation that the electronic device is recognizing a facial object, the electronic device may determine that the under-screen camera of the electronic device is in state 1 in the second working cycle according to the information of the operation.

For state 2 and state 3, the electronic device may obtain the target state information by obtaining a vibration frequency of a vibration sensor of the electronic device or positions of the same object (which specifically may be images of the same object) in two images continuously captured by the under-screen camera, to determine whether the under-screen camera of the electronic device is in one of the target states in the second working cycle according to the target state information. In one manner, it is assumed that the target state information obtained by the electronic device is the vibration frequency of the vibration sensor. In this case, if the vibration frequency of the vibration sensor is greater than or equal to a preset frequency threshold, the electronic device may determine that the under-screen camera moves relative to the object captured by the under-screen camera, that is, the electronic device may determine that the under-screen camera of the electronic device is in state 2 in the second working cycle. If the vibration frequency of the vibration sensor obtained by the electronic device is less than the preset frequency threshold, the electronic device may determine that the under-screen camera does not move relative to the object captured by the under-screen camera, that is, the electronic device may determine that the under-screen camera of the electronic device is in state 3 in the second working cycle. In another manner, it is assumed that the target state information obtained by the electronic device is positions of the same object in two images continuously captured by the under-screen camera. In this case, if a distance between the positions of the object in two images is greater than or equal to a preset position threshold, the electronic device may determine that the under-screen camera moves relative to the object captured by the under-screen camera, that is, the electronic device may determine that the under-screen camera of the electronic device is in state 2 in the second working cycle. If the positions of the object in two images are less than the preset location threshold, the electronic device may determine that the under-screen camera does not move relative to the object captured by the under-screen camera, that is, the electronic device may determine that the under-screen camera of the electronic device is in state 3 in the second working cycle.

For state 4, the electronic device may obtain the target state information by obtaining an instruction that the electronic device executes on the under-screen camera most recently, to determine whether the under-screen camera of the electronic device is in one of the target states in the second working cycle according to the target state information. If the instruction that the electronic device executes on the under-screen camera most recently is a disabling instruction, the electronic device may determine that the under-screen camera of the electronic device is in state 4 in the second working cycle according to the disabling instruction.

For example, in the embodiments of the present disclosure, the foregoing S203 may be specifically implemented by the following S203a or S203b.

S203a: In a case that the target state indicated by the target state information is a first state, the electronic device increases the ratio of the first duration in the first working cycle to the total duration of the capturing process.

The first state may be that the under-screen camera recognizes a facial object (that is, state 1), or may be that the under-screen camera moves relative to the object captured by the under-screen camera (that is, state 2).

For example, in the embodiments of the present disclosure, when the target state of the under-screen camera of the electronic device in the second working cycle is state 1, that is, when the electronic device recognizes a facial object through the under-screen camera, the electronic device may increase the ratio of the first duration in the first working cycle to the total duration of the capturing process, to quickly complete identity authentication.

For example, in the embodiments of the present disclosure, when the target state of the under-screen camera of the electronic device in the second working cycle is state 2, that is, the under-screen camera of the electronic device moves relative to the object captured by the under-screen camera, the electronic device may also increase the ratio of the first duration in the first working cycle to the total duration of the capturing process, to improve the imaging quality of the camera.

For example, in the embodiments of the present disclosure, that the electronic device increases the ratio of the first duration in the first working cycle to the total duration of the capturing process may be any one of the following: 1. increasing the first duration in the first working cycle and keeping the second duration in the first working cycle unchanged; and 2. increasing the first duration in the first working cycle and shortening the second duration in the first working cycle.

In 1, the first working cycle after adjustment is greater than the first working cycle before adjustment. In 2, the period of the first duration and the second duration may be equal to, greater than, or less than the period before adjustment.

For example, in the embodiments of the present disclosure, in state 1 and state 2, the ratios of the first duration and the second duration may be the same or different. This may be specifically determined according to an actual usage requirement, and is not limited in the embodiments of the present disclosure.

S203b: In a case that the target state indicated by the target state information is that the under-screen camera is stationary relative to an object captured by the under-screen camera, the electronic device reduces the ratio of the first duration in the first working cycle to the total duration of the capturing process.

For example, in the embodiments of the present disclosure, that the electronic device reduces the ratio of the first duration in the first working cycle to the total duration of the capturing process may be any one of the following: 3. reducing the first duration in the first working cycle and keeping the second duration in the first working cycle unchanged; and 4. reducing the first duration in the first working cycle and increasing the second duration in the first working cycle.

In 3, the first working cycle after adjustment is less than the first working cycle before adjustment. In 4, the first working cycle after adjustment may be equal to, greater than, or less than the first working cycle before adjustment.

For example, in the embodiments of the present disclosure, when the target state of the under-screen camera of the electronic device in the second working cycle is state 3, that is, the under-screen camera of the electronic device is stationary relative to the object captured by the under-screen camera, the electronic device may reduce the ratio of the first duration in the first working cycle to the total duration of the capturing process, to further improve the screen display effect of the electronic device while ensuring the imaging quality of the under-screen camera.

For example, in the embodiments of the present disclosure, when the target state of the under-screen camera of the electronic device in the second working cycle is state 4, that is, when the under-screen camera of the electronic device is disabled, the electronic device may set the ratio of the first duration in the first working cycle to the total duration of the capturing process to 0. Specifically, the electronic device may set the first duration in the first working cycle to 0. In this case, since the electronic device does not capture an image through the under-screen camera, the electronic device may keep the luminance value of the first screen area as the target luminance value, to improve the screen display effect of the electronic device.

For example, in the embodiments of the present disclosure, in the four states, the ratios of the first duration in the first working cycle to the second duration in the first working cycle may be completely different, or may be partially different. This may be specifically determined according to an actual usage requirement, and is not limited in the embodiments of the present disclosure.

Figure 5:
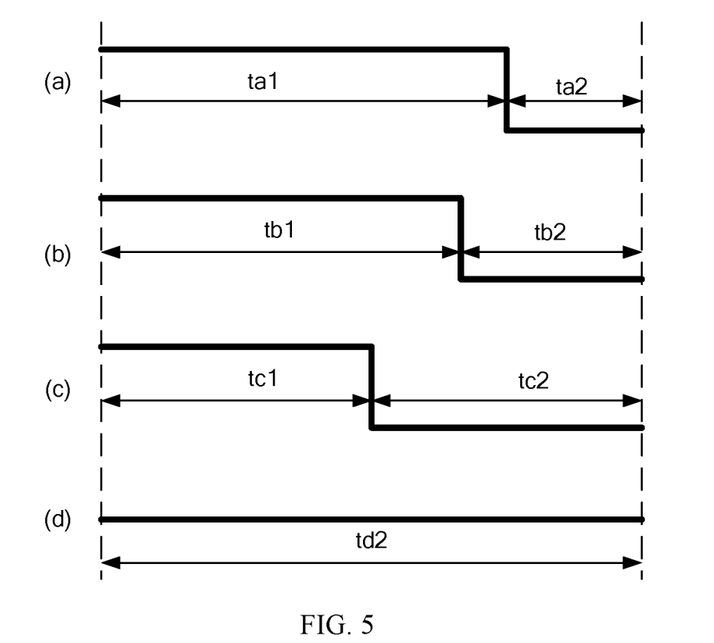
FIG. 5 is a schematic time sequence diagram 2 of a shooting control method according to an embodiment of the present disclosure.

The duration ratios in the four states, that is, the ratios of the first duration in the first cycle to the second duration in the first cycle, will be exemplarily described below with reference to FIG. 5. For ease of description, in FIG. 5, the first duration in the first cycle is abbreviated as the first duration, and the second duration in the first cycle is abbreviated as the second duration.

Exemplarily, it is assumed that in state 1, the ratio of the first duration to the second duration is 3:1; in state 2, the ratio of the first duration to the second duration is 2:1; in state 3, the ratio of the first duration to the second duration is 1:1; and in state 4, the ratio of the first duration to the second duration is 0:1. In this case, as shown in (a) of FIG. 5, in state 1, the first duration is ta1 and the second duration is ta2, and ta1:ta2=3:1; as shown in (b) of FIG. 5, in state 2, the first duration is tb1 and the second duration is tb2, and tb1:tb2=2:1; as shown in (c) in FIG. 5, in state 3, the first duration is tc1 and the second duration is tc2, and tc1:tc2=1:1; as shown in (d) in FIG. 5, in state 4, the first duration is td1 the second duration is td2, and td1:td2=0:1.

In the embodiments of the present disclosure, because the electronic device may adjust the ratios of the first duration in the first working cycle and the second duration in the first working cycle to the total duration of the image capturing process according to the target state of the under-screen camera of the electronic device in the previous working cycle, shooting of the under-screen camera can be controlled more flexibly.

It should be noted that in the embodiments of the present disclosure, the shooting control method shown in each of the foregoing accompanying drawings is described by using an accompanying drawing in the embodiments of the present disclosure as an example. In specific implementation, the shooting control method shown in each of the accompanying drawings can also be implemented with reference to any other accompanying drawings that can be combined in the above embodiments, which is not repeated herein.

Figure 6:
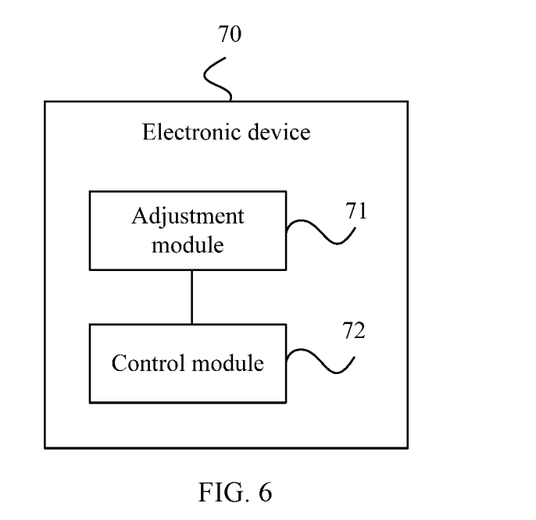
FIG. 6 is a schematic structural diagram of an electronic device according to an embodiment of the present disclosure.

As shown in FIG. 6, an embodiment of the present disclosure provides an electronic device 70. The electronic device 70 may include: an adjustment module 71 and a control module 72. The adjustment module 71 may be configured to: within a first duration of each working cycle of a capturing process, adjust a luminance value of a first screen area of the electronic device from a target luminance value to a preset luminance value. The control module 72 may be configured to: within the first duration of each working cycle of the capturing process, after the adjustment module adjusts the luminance value of the first screen area from the target luminance value to the preset luminance value, control an under-screen camera of the electronic device to capture an image; and within the second duration after each first duration in the capturing process, control the under-screen camera of the electronic device to stop capturing an image. The adjustment module 71 may be further configured to: after the control module 72 controls the under-screen camera to stop capturing an image within the second duration, adjust the luminance value of the first screen area from the preset luminance value to the target luminance value. The first screen area may include a second screen area, and the second screen area may be an area that is on the screen of the electronic device and that corresponds to a position of the under-screen camera in a lower area of the screen.

For example, in the embodiments of the present disclosure, the first duration may be less than or equal to a duration of persistence of vision of the human eye, and may be greater than or equal to a duration for capturing a frame image by the under-screen camera.

For example, in the embodiments of the present disclosure, the adjustment module 71 may be further configured to adjust ratios of the first duration in a first working cycle and the second duration in the first working cycle to a total duration of the capturing process according to target state information. The first working cycle may be a next working cycle of a second working cycle, the target state information may be used to indicate a target state of the under-screen camera of the electronic device in the second working cycle, and the target state may be any one of the following: the under-screen camera recognizes a facial object, the under-screen camera moves relative to an object captured by the under-screen camera, the under-screen camera is stationary relative to an object captured by the under-screen camera, and the under-screen camera is disabled.

For example, in the embodiments of the present disclosure, the preset luminance value may be 0.

For example, in the embodiments of the present disclosure, the adjustment module 71 is specifically configured to: in a case that the target state indicated by the target state information is a first state, increase the ratio of the first duration in the first working cycle to the total duration of the capturing process; or in a case that the target state indicated by the target state information is that the under-screen camera is stationary relative to an object captured by the under-screen camera, reduce the ratio of the first duration in the first working cycle to the total duration of the capturing process. The first state may be that the under-screen camera recognizes a facial object, or may be that the under-screen camera moves relative to the object captured by the under-screen camera.

For example, in the embodiments of the present disclosure, the adjustment module 71 may be specifically configured to adjust a luminance value of light corresponding to a target color in the first screen area from the target luminance value to the preset luminance value, where the target color may be a color corresponding to light with the longest wavelength in the first screen area.

The electronic device 70 provided in the embodiments of the present disclosure can implement the various processes implemented by the electronic device shown in the foregoing method embodiments, and to avoid repetition, details are not repeated here.

The embodiments of the present disclosure provide an electronic device. Within the first duration of each working cycle (including a first duration and a second duration) of the capturing process (that is, an image capturing process), the electronic device may adjust the luminance value of the first screen area (including an area that corresponds to a position of the under-screen camera in a lower area of the screen) of the electronic device from the target luminance value to the preset luminance value, and control the under-screen camera of the electronic device to capture an image; and within the second duration after each first duration in the capturing process, control the under-screen camera of the electronic device to stop capturing an image, and adjust the luminance value of the first screen area from the preset luminance value to the target luminance value. In this solution, when the electronic device captures an image through the under-screen camera, on the one hand, the electronic device may first reduce the luminance of the screen area corresponding to the under-screen camera before capturing an image, and then control the under-screen camera to capture an image. Therefore, this can prevent light emitted by the screen from affecting the images captured by the under-screen camera. On the other hand, the electronic device may increase the luminance of the screen area corresponding to the under-screen camera after controlling the under-screen camera to stop capturing an image. Therefore, this can ensure that the screen has a desirable display effect when the under-screen camera does not capture an image. In this way, the shooting control method provided by the embodiments of the present disclosure can not only ensure that the image captured by the under-screen camera is not distorted, but also can ensure that the screen has a desirable display effect.

Figure 7:
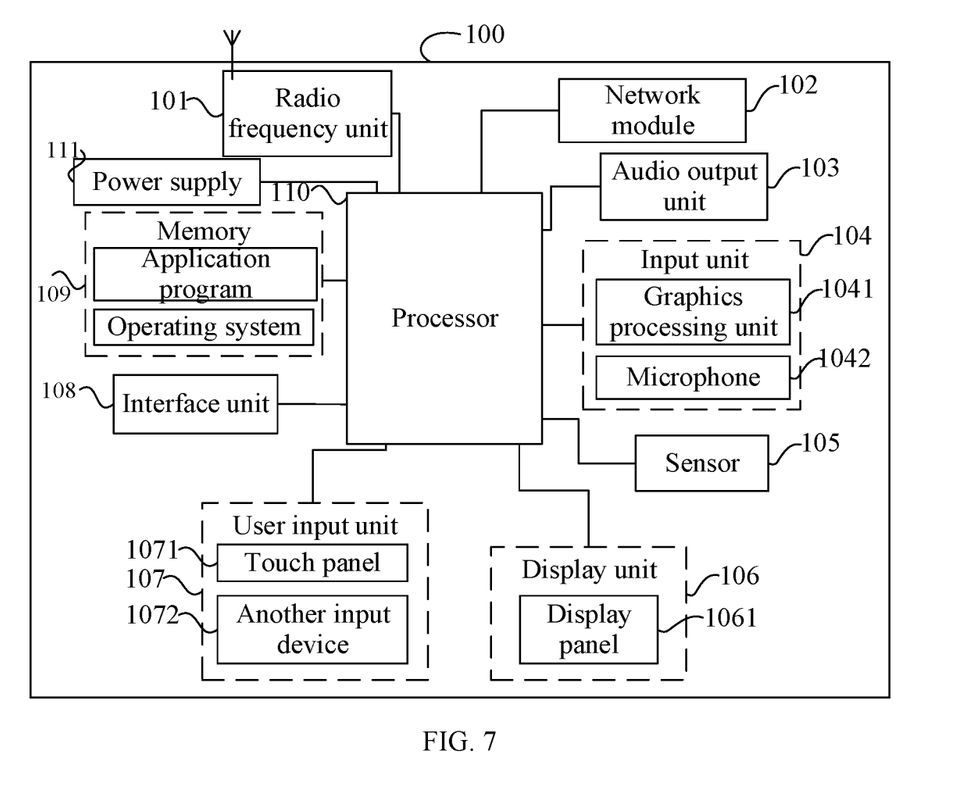
FIG. 7 is a schematic diagram of hardware of an electronic device according to an embodiment of the present disclosure.

FIG. 7 is a schematic diagram of a hardware structure of an electronic device implementing embodiments of the present disclosure. As shown in FIG. 7, the electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the electronic device shown in FIG. 7 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The processor 110 is configured to: within a first duration of each working cycle of a capturing process, adjust a luminance value of a first screen area of the electronic device from a target luminance value to a preset luminance value, and control an under-screen camera of the electronic device to capture an image; and within the second duration after each first duration in the capturing process, control the under-screen camera of the electronic device to stop capturing an image, and adjust the luminance value of the first screen area from the preset luminance value to the target luminance value. Each working cycle includes a first duration and a second duration. The preset luminance value is less than the target luminance value, the first screen area includes the second screen area, and the second screen area is an area that corresponds to a position of the under-screen camera in a lower area of the screen.

It may be understood that, in the embodiments of the present disclosure, the adjustment module 71 and the control module 72 in the schematic structural diagram (for example, FIG. 6) of the electronic device may be implemented by the processor 110.

The embodiments of the present disclosure provide an electronic device. Within the first duration of each working cycle (including a first duration and a second duration) of the capturing process (that is, an image capturing process), the electronic device may adjust the luminance value of the first screen area (including an area that corresponds to a position of the under-screen camera in a lower area of the screen) of the electronic device from the target luminance value to the preset luminance value, and control the under-screen camera of the electronic device to capture an image; and within the second duration after each first duration in the capturing process, control the under-screen camera of the electronic device to stop capturing an image, and adjust the luminance value of the first screen area from the preset luminance value to the target luminance value. In this solution, when the electronic device captures an image through the under-screen camera, on the one hand, the electronic device may first reduce the luminance of the screen area corresponding to the under-screen camera before capturing an image, and then control the under-screen camera to capture an image. Therefore, this can prevent light emitted by the screen from affecting the images captured by the under-screen camera. On the other hand, the electronic device may increase the luminance of the screen area corresponding to the under-screen camera after controlling the under-screen camera to stop capturing an image. Therefore, this can ensure that the screen has a desirable display effect when the under-screen camera does not capture an image. In this way, the shooting control method provided by the embodiments of the present disclosure can not only ensure that the image captured by the under-screen camera is not distorted, but also can ensure that the screen has a desirable display effect.

It should be understood that in the embodiments of the present disclosure, the radio frequency unit 101 may be configured to receive and transmit information, or receive and transmit signals during a call. Specifically, the radio frequency unit receives downlink data from a base station, and transmits the downlink data to the processor 110 for processing; and transmits uplink data to the base station. Generally, the radio frequency unit 101 includes, but is not limited to, an antenna, at least one amplifier, a transceiver, a coupler, a low noise amplifier, and a duplexer. In addition, the radio frequency unit 101 may also communicate with a network and other devices through a wireless communication system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal and output the audio signal as a sound. Moreover, the audio output unit 103 may further provide audio output related to a specific function performed the electronic device 100 (for example, call signal receiving sound and message receiving sound). The audio output unit 103 includes a speaker, a buzzer, a telephone receiver, and the like.

The input unit 104 is configured to receive audio or radio frequency signals. The input unit 104 may include a Graphics Processing Unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and may process such sound into audio data. The audio data obtained through processing may be converted, in a telephone call mode, into a format that may be sent to a mobile communication base station via the radio frequency unit 101 for output.

The electronic device 100 further includes at least one sensor 105, for example, a light sensor, a motion sensor, and another sensor. Specifically, the light sensor includes an ambient light sensor and a proximity sensor. The ambient light sensor may adjust luminance of a display panel 1061 according to ambient light luminance. The proximity sensor may switch off the display panel 1061 and/or backlight when the electronic device 100 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 106 is configured to display information entered by the user or information provided for the user. The display unit 106 may include a display panel 1061. The display panel 1061 may be configured in a form of a Liquid Crystal Display (LCD), an Organic Light-Emitting Diode (OLED), or the like.

The user input unit 107 may be configured to receive entered number or character information, and generate key signal input related to user settings and function control of the electronic device. Specifically, the user input unit 107 includes a touch panel 1071 and another input device 1072. The touch panel 1071 is also referred to as a touchscreen, and may collect a touch operation of the user on or near the touch panel 1071 (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by various types such as a resistive type, a capacitive type, an infrared ray type or a surface acoustic wave type. In addition to the touch panel 1071, the user input unit 107 may further include other input devices 1072. Specifically, the other input devices 1072 may include but are not limited to: a physical keyboard, a function key (such as a volume control key, a switch key), a trackball, a mouse, and a joystick, which is no longer repeated here.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 7, the touch panel 1071 and the display panel 1061 are configured as two independent components to implement input and output functions of the electronic device, in some embodiments, the touch panel 1071 and the display panel 1061 may be integrated to implement the input and output functions of the electronic device. Details are not limited herein.

The interface unit 108 is an interface for connecting an external apparatus and the electronic device 100. For example, the external apparatus may include a wired or wireless headset jack, an external power supply (or a battery charger) port, a wired or wireless data port, a storage card port, a port for connecting an apparatus having an identification module, an audio Input/Output (I/O) port, a video I/O port, a headset jack, or the like. The interface unit 108 may be configured to receive input from an external apparatus (for example, data information and power) and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 109 may include a high-speed random access memory or a nonvolatile memory, for example, at least one disk storage device, a flash memory, or other volatile solid-state storage devices.

The processor 110 is a control center of the electronic device and connects all parts of the electronic device using various interfaces and circuits. By running or executing software programs and/or modules stored in the memory 109 and by calling data stored in the memory 109, the processor implements various functions of the electronic device and processes data, thus performing overall monitoring on the electronic device. The processor 110 may include one or more processing units. For example, the processor 110 may be integrated with an application processor and a modem processor. The application processor mainly processes an operating system, a user interface, an application program, and the like, and the modem processor mainly processes wireless communication. It may be understood that the modem processor may not be integrated into the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some functional modules not shown. Details are not described herein again.

For example, the embodiments of the present disclosure further provide an electronic device, including a processor 110 shown in FIG. 7, a memory 109, and a computer program stored in the memory 109 and executable on the processor 110. When the computer program is executed by the processor 110, the processes of the foregoing method embodiment are implemented, and a same technical effect can be achieved. To avoid repetition, details are not described herein again.

Embodiments of the present disclosure further provide a computer readable storage medium. The computer readable storage medium stores a computer program. The computer program implements, when executed by a processor, each process of the foregoing method embodiments, and a same technical effect can be achieved. To avoid repetition, details are not described herein again. The computer-readable storage medium may include a Read-Only Memory (ROM), a Random Access Memory (RAM), a magnetic disk, an optical disc, or the like.

An embodiment of the present disclosure further provides a computer program product. The computer program product is executed by at least one processor to implement the foregoing shooting control method, and a same technical effect can be achieved. To avoid repetition, details are not described herein again.

An embodiment of the present disclosure further provides an electronic device, configured to execute the foregoing shooting control method.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present application essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present application.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. A shooting control method, performed by an electronic device, comprising:
within a first duration of each working cycle of a capturing process, adjusting a luminance value of a first screen area of the electronic device from a target luminance value to a preset luminance value, and controlling an under-screen camera of the electronic device to capture an image, wherein each working cycle comprises the first duration and a second duration;
within the second duration after each first duration in the capturing process, controlling the under-screen camera of the electronic device to stop capturing an image, and adjusting the luminance value of the first screen area from the preset luminance value to the target luminance value, wherein the preset luminance value is less than the target luminance value, the first screen area comprises a second screen area, and the second screen area is an area that corresponds to a position of the under-screen camera under a screen of the electronic device; and adjusting ratios of the first duration in a first working cycle and the second duration in the first working cycle to a total duration of the capturing process according to a target state of the under-screen camera in a second working cycle immediately before the first working cycle.

2. The method according to claim 1, wherein the first duration is less than or equal to a duration of persistence of vision of the human eye, and is greater than or equal to a duration for capturing a frame image by the under-screen camera.

3. The method according to claim 1, wherein
the target state is any one of the following: the under-screen camera recognizes a facial object, the under-screen camera moves relative to an object captured by the under-screen camera, and the under-screen camera is stationary relative to an object captured by the under-screen camera.

4. The method according to claim 3, wherein the adjusting ratios of the first duration in a first working cycle and the second duration in the first working cycle to a total duration of the capturing process according to target state information comprises:
in a case that the target state indicated by the target state information is a first state, increasing the ratio of the first duration in the first working cycle to the total duration of the capturing process; or
in a case that the target state indicated by the target state information is that the under-screen camera is stationary relative to an object captured by the under-screen camera, reducing the ratio of the first duration in the first working cycle to the total duration of the capturing process; wherein
the first state is that the under-screen camera recognizes a facial object, or the under-screen camera moves relative to an object captured by the under-screen camera.

5. The method according to claim 1, wherein the adjusting a luminance value of a first screen area of the electronic device from a target luminance value to a preset luminance value comprises:
adjusting a luminance value of a light corresponding to a target color in the first screen area from the target luminance value to the preset luminance value, wherein the target color is a color corresponding to the light with the longest wavelength among lights of different wavelengths that are emitted by the screen in the first screen area.

6. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
within a first duration of each working cycle of a capturing process, adjusting a luminance value of a first screen area of the electronic device from a target luminance value to a preset luminance value, and controlling an under-screen camera of the electronic device to capture an image, wherein each working cycle comprises the first duration and a second duration;

within the second duration after each first duration in the capturing process, controlling the under-screen camera of the electronic device to stop capturing an image, and adjusting the luminance value of the first screen area from the preset luminance value to the target luminance value, wherein
the preset luminance value is less than the target luminance value, the first screen area comprises a second screen area, and the second screen area is an area that corresponds to a position of the under-screen camera under a screen of the electronic device; and
adjusting ratios of the first duration in a first working cycle and the second duration in the first working cycle to a total duration of the capturing process according to a target state of the under-screen camera in a second working cycle immediately before the first working cycle.

7. The electronic device according to claim 6, wherein the first duration is less than or equal to a duration of persistence of vision of the human eye, and is greater than or equal to a duration for capturing a frame image by the under-screen camera.

8. The electronic device according to claim 6, wherein
the target state is any one of the following: the under-screen camera recognizes a facial object, the under-screen camera moves relative to an object captured by the under-screen camera, and the under-screen camera is stationary relative to an object captured by the under-screen camera.

9. The electronic device according to claim 8, wherein the adjusting ratios of the first duration in a first working cycle and the second duration in the first working cycle to a total duration of the capturing process according to target state information comprises:
in a case that the target state indicated by the target state information is a first state, increasing the ratio of the first duration in the first working cycle to the total duration of the capturing process; or
in a case that the target state indicated by the target state information is that the under-screen camera is stationary relative to an object captured by the under-screen camera, reducing the ratio of the first duration in the first working cycle to the total duration of the capturing process;
wherein the first state is that the under-screen camera recognizes a facial object, or the under-screen camera moves relative to an object captured by the under-screen camera.

10. The electronic device according to claim 6, wherein the adjusting a luminance value of a first screen area of the electronic device from a target luminance value to a preset luminance value comprises:
adjusting a luminance value of a light corresponding to a target color in the first screen area from the target luminance value to the preset luminance value, wherein the target color is a color corresponding to the light with the longest wavelength among lights of different wavelengths that are emitted by the screen in the first screen area.

11. A non-transitory computer readable medium storing instructions that, when executed by a processor, cause the processor to perform a method of shooting control, wherein the method comprises:
within a first duration of each working cycle of a capturing process, adjusting a luminance value of a first screen area of an electronic device from a target luminance value to a preset luminance value, and controlling an under-screen camera of the electronic device to capture an image, wherein each working cycle comprises the first duration and a second duration;

within the second duration after each first duration in the capturing process, controlling the under-screen camera of the electronic device to stop capturing an image, and adjusting the luminance value of the first screen area from the preset luminance value to the target luminance value, wherein the preset luminance value is less than the target luminance value, the first screen area comprises a second screen area, and the second screen area is an area that corresponds to a position of the under-screen camera under a screen of the electronic device; and adjusting ratios of the first duration in a first working cycle and the second duration in the first working cycle to a total duration of the capturing process according to a target state of the under-screen camera in a second working cycle immediately before the first working cycle.

12. The non-transitory computer readable medium according to claim 11, wherein the first duration is less than or equal to a duration of persistence of vision of the human eye, and is greater than or equal to a duration for capturing a frame image by the under-screen camera.

13. The non-transitory computer readable medium according to claim 11, wherein the target state is any one of the following: the under-screen camera recognizes a facial object, the under-screen camera moves relative to an object captured by the under-screen camera, and the under-screen camera is stationary relative to an object captured by the under-screen camera.

14. The non-transitory computer readable medium according to claim 13, wherein the adjusting ratios of the first duration in a first working cycle and the second duration in the first working cycle to a total duration of the capturing process according to target state information comprises:

in a case that the target state indicated by the target state information is a first state, increasing the ratio of the first duration in the first working cycle to the total duration of the capturing process; or in a case that the target state indicated by the target state information is that the under-screen camera is stationary relative to an object captured by the under-screen camera, reducing the ratio of the first duration in the first working cycle to the total duration of the capturing process; wherein the first state is that the under-screen camera recognizes a facial object, or the under-screen camera moves relative to an object captured by the under-screen camera.

15. The non-transitory computer readable medium according to claim 11, wherein the adjusting a luminance value of a first screen area of the electronic device from a target luminance value to a preset luminance value comprises:

adjusting a luminance value of a light corresponding to a target color in the first screen area from the target luminance value to the preset luminance value, wherein the target color is a color corresponding to the light with the longest wavelength among lights of different wavelengths that are emitted by the screen in the first screen area.

* * * * *